Jan. 28, 1964 C. A. CRAFTS 3,119,964

PHASE SHIFT KEYING COMMUNICATION SYSTEM INCLUDING AUTOMATIC PHASE CORRECTION MEANS

Filed Aug. 14, 1958 8 Sheets-Sheet 1

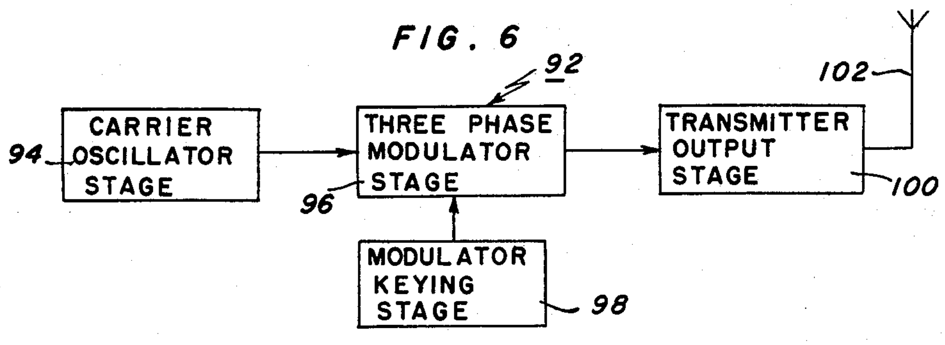
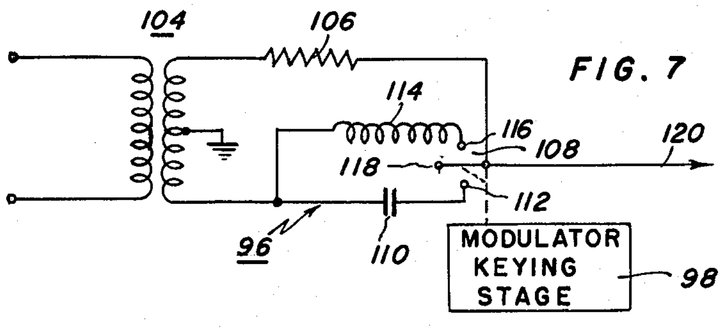
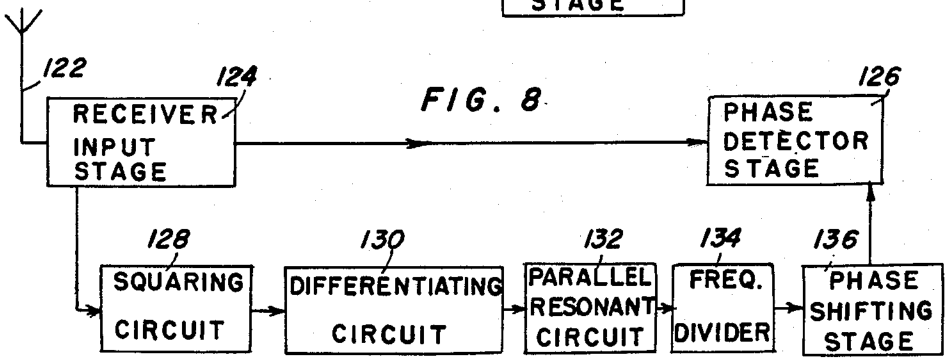
FIG. 9A FIG. 9B FIG. 9C FIG. 9D
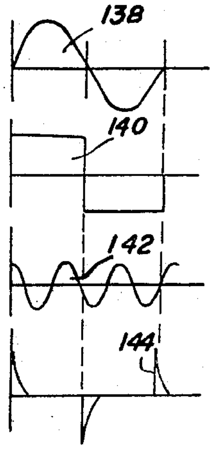

United States Patent Office 3,119,964
Patented Jan. 28, 1964

3,119,964
PHASE SHIFT KEYING COMMUNICATION SYSTEM INCLUDING AUTOMATIC PHASE CORRECTION MEANS

Cecil A. Crafts, Santa Ana, Calif., assignor to Robertshaw Controls Company, a corporation of Delaware Filed Aug. 14, 1958, Ser. No. 755,088
15 Claims. (Cl. 325—30)

This invention relates to communication systems, and more particularly to a system and method employing phase shift keying for modulating a carrier wave. This application is an improvement over the invention disclosed in application Serial No. 731,334, filed on April 28, 1958.

In many modern day phase shift communication systems, it is necessary to propagate a separate reference signal which is employed in the receiver for retrieving the information implicit in the modulated signal. In such systems, the atmospheric attenuations and diminutions in the signal strength of the reference signal present a large possibility for error.

The invention disclosed and claimed in application Serial No. 731,334 contemplates method and apparatus for use in keyed type communication systems such as teletype and binary data transmission systems. In one aspect of that invention, the information which it is desired to transmit is impressed upon a carrier wave by periodically effecting a phase shift of 180° in the wave. The reference signal is derived from the modulated carrier wave at the receiver, and the requirement for a separate reference signal is entirely eliminated.

By employing such a method of operation, a very substantial reduction in band width is achieved, as compared to conventional systems which modulate either the frequency or amplitude of a carrier signal. This is because the only side bands generated in the propagation of the signal are those produced by the keying frequency.

The transfer of such information by means of a single frequency, as taught by the patent application above identified, eliminates the disadvantages which invariably attend the use of a pilot carrier in prior art systems. In addition, the derivation of the reference signal directly from the modulated signal detected at the receiver improves the stability which is often lacking in the use of artificial reference signals in many known communication systems.

According to another aspect of the invention in the above identified application, the information which it is desired to transmit is impressed upon a carrier wave by periodically providing phase displacements of 0°, 120°, and 240° in the carrier wave. By practicing still another aspect of that invention, the information to be propagated is impressed upon a carrier wave by selectively effecting phase displacements of 0°, 90°, 180°, and 270°. Moreover, in addition to providing method and apparatus for retrieving information from a carrier by distinguishing between the respective phases thereof, that invention provides method and apparatus for distinguishing between the various phase signals on a time basis.

In the present invention, a system and method for insuring correct phase relationships between the received signal and the reference signal derived within the receiver circuitry is disclosed and claimed. In addition, circuitry is provided for insuring that the polarity of the receiver output signal matches that of the initial transmitter input.

According to another aspect of the present invention, automatic phase corrections in the self-derived reference signal within the receiver are effected. Thus, corrections in undesirable polarity permutations caused by noise or other extraneous signals are effected extremely rapidly.

Accordingly, therefore, a primary object of this invention is to derive an automatically corrected phase reference signal from a phase modulated carrier wave in a suitable system.

A further object of the present invention is to insure correct phase relationships in a reference signal derived within a phase shift keying receiver circuit.

A further object of the invention is to identically match the transmitter input signal to the polarity of the receiver output potential at the commencement of transmission.

A further object of the invention is to exploit phase modulated carrier waves in a system which has the capacity for deriving a phase reference signal therefrom, and effecting rapid corrections in the phase of the reference signal in order to obviate the effect of noise or other extraneous conditions on such a reference signal.

A still further object of the invention is to correct automatically any undesired polarity permutations which occur in the reference signal derived within a phase shift keying receiver system.

These and other objects and advantages of the present invention will become apparent by referring to the following detailed description and drawings in which:

FIGURE 6 is a block diagram of the transmitter utilized for propagating a carrier wave characterized by three input conditions or phase positions;

FIGURE 7 is a wiring diagram of the circuitry and components of the three phase modulator stage employed in FIGURE 6;

FIGURE 8 is a block diagram of the receiver circuitry employed in abstracting information from a three phase modulated carrier wave;

Figure 10:
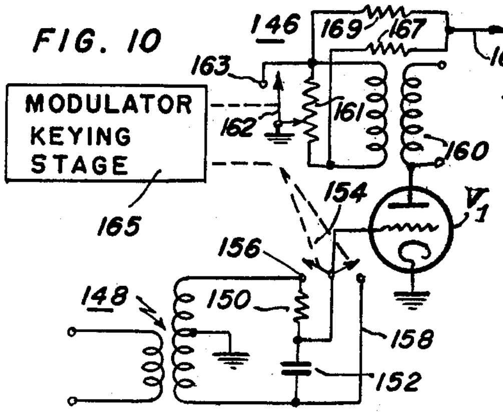
Figure 13:
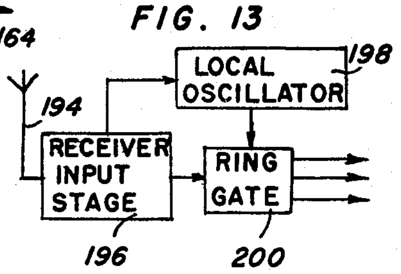
Figure 11:
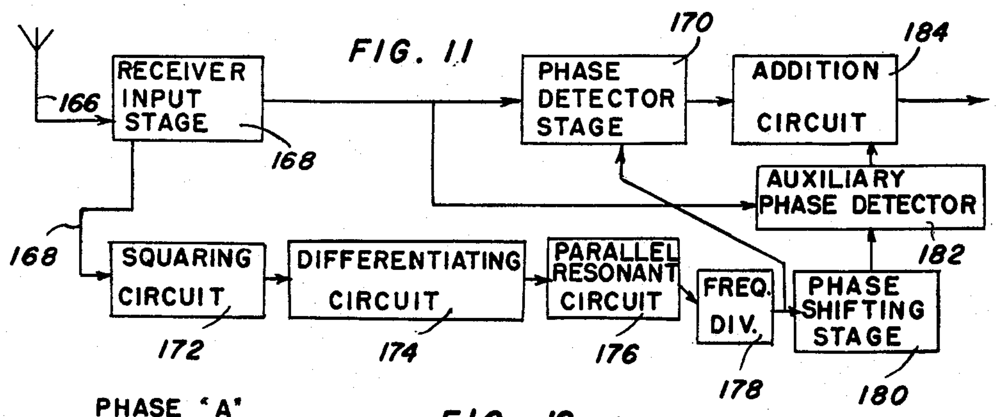
Figure 12:
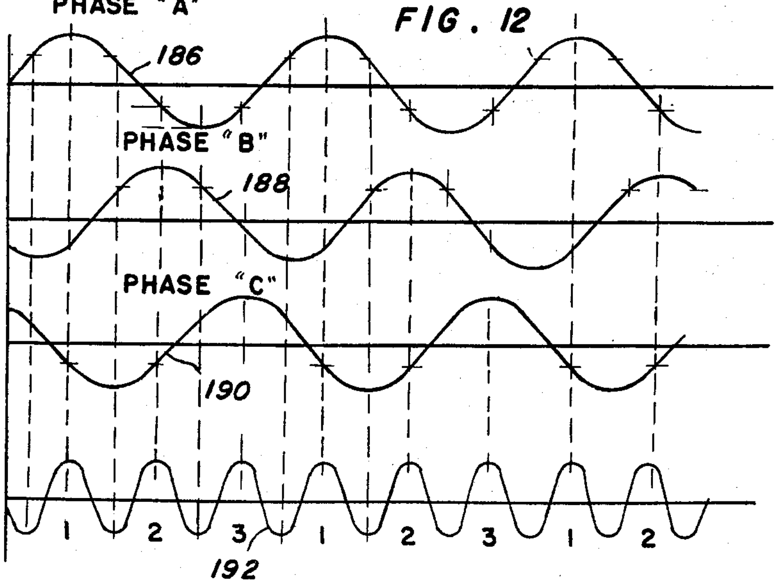
Figure 14:
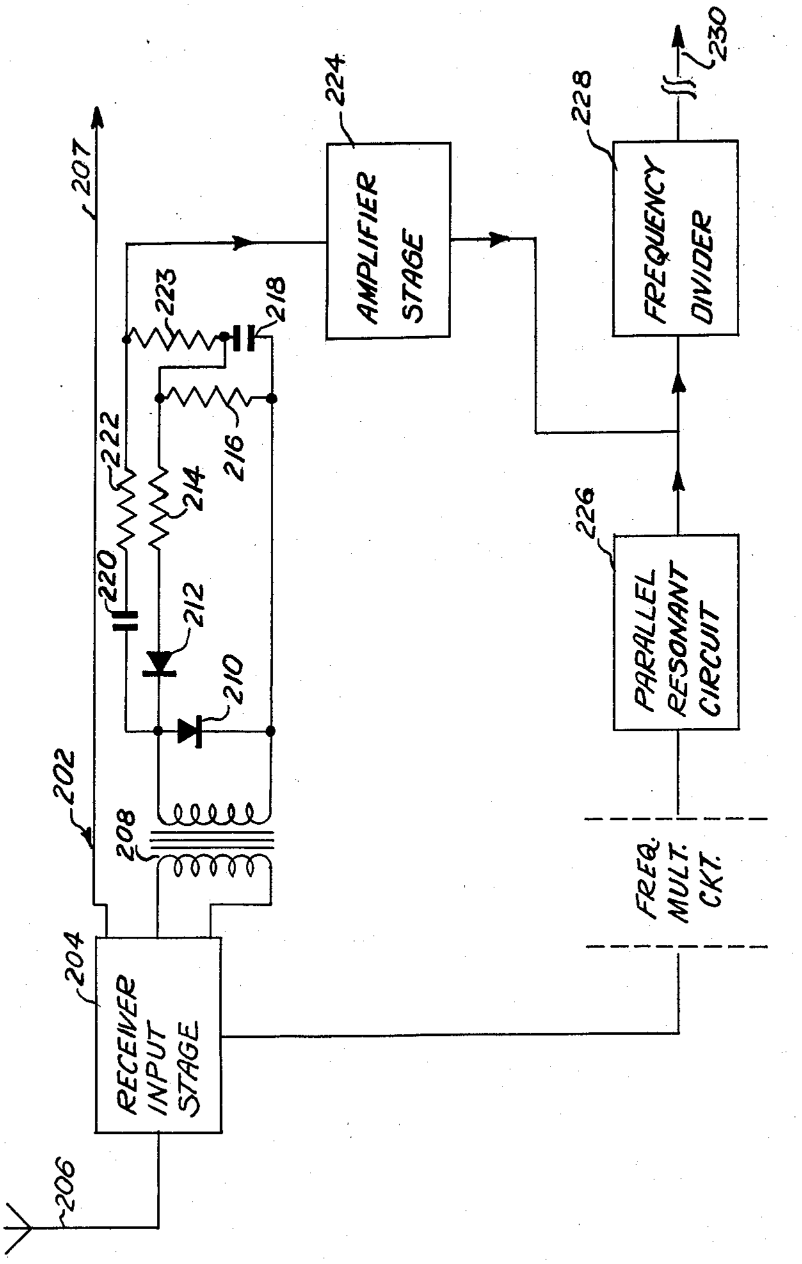
Figure 15:
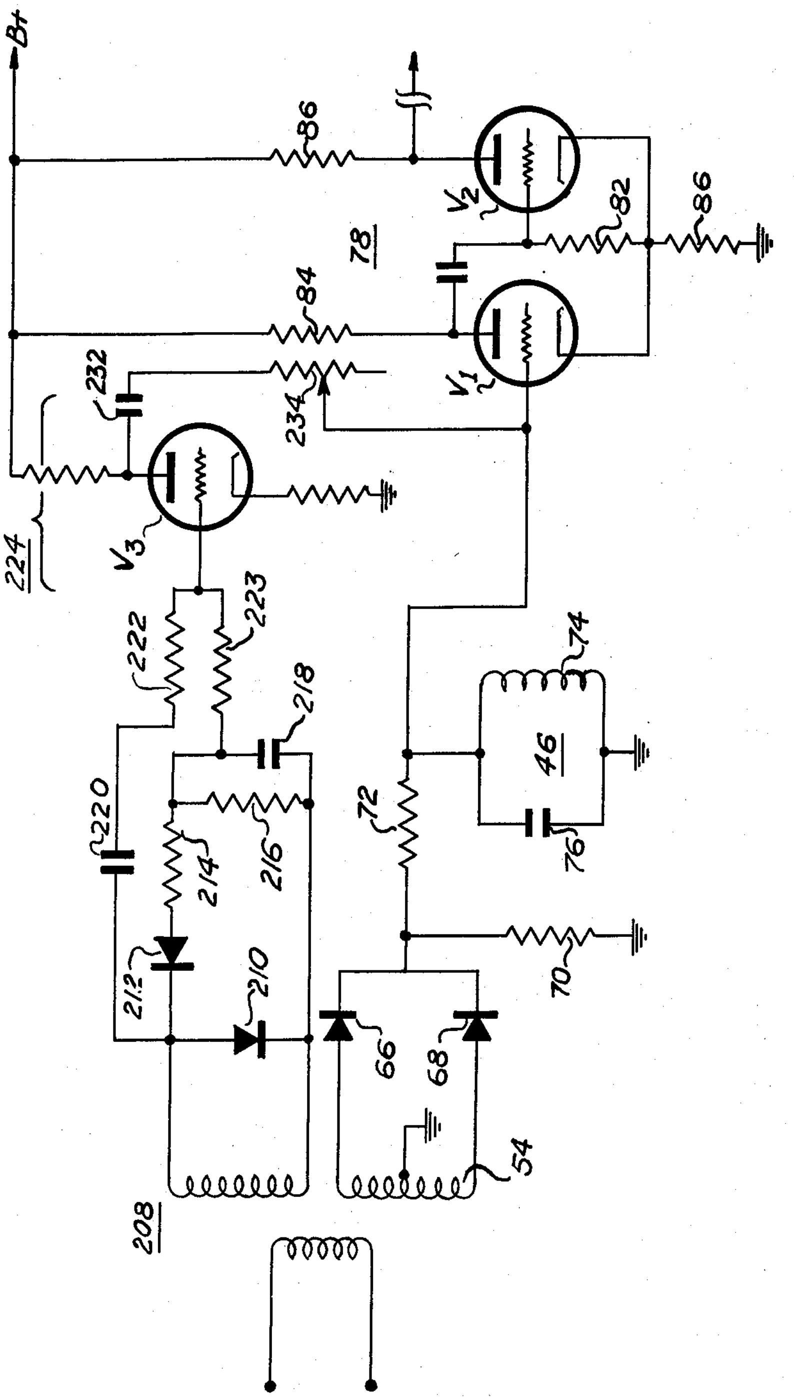
Figure 16:
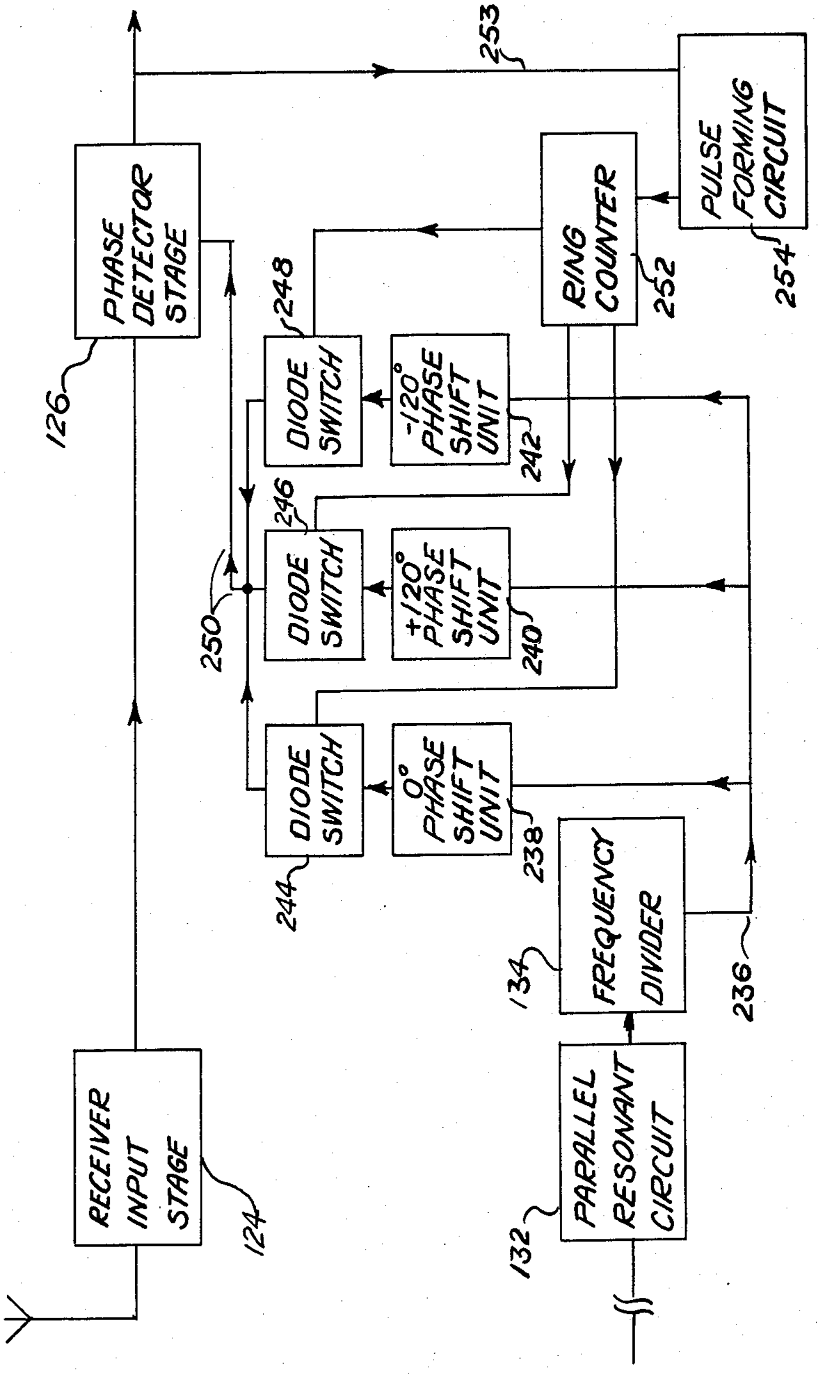
Figure 17:
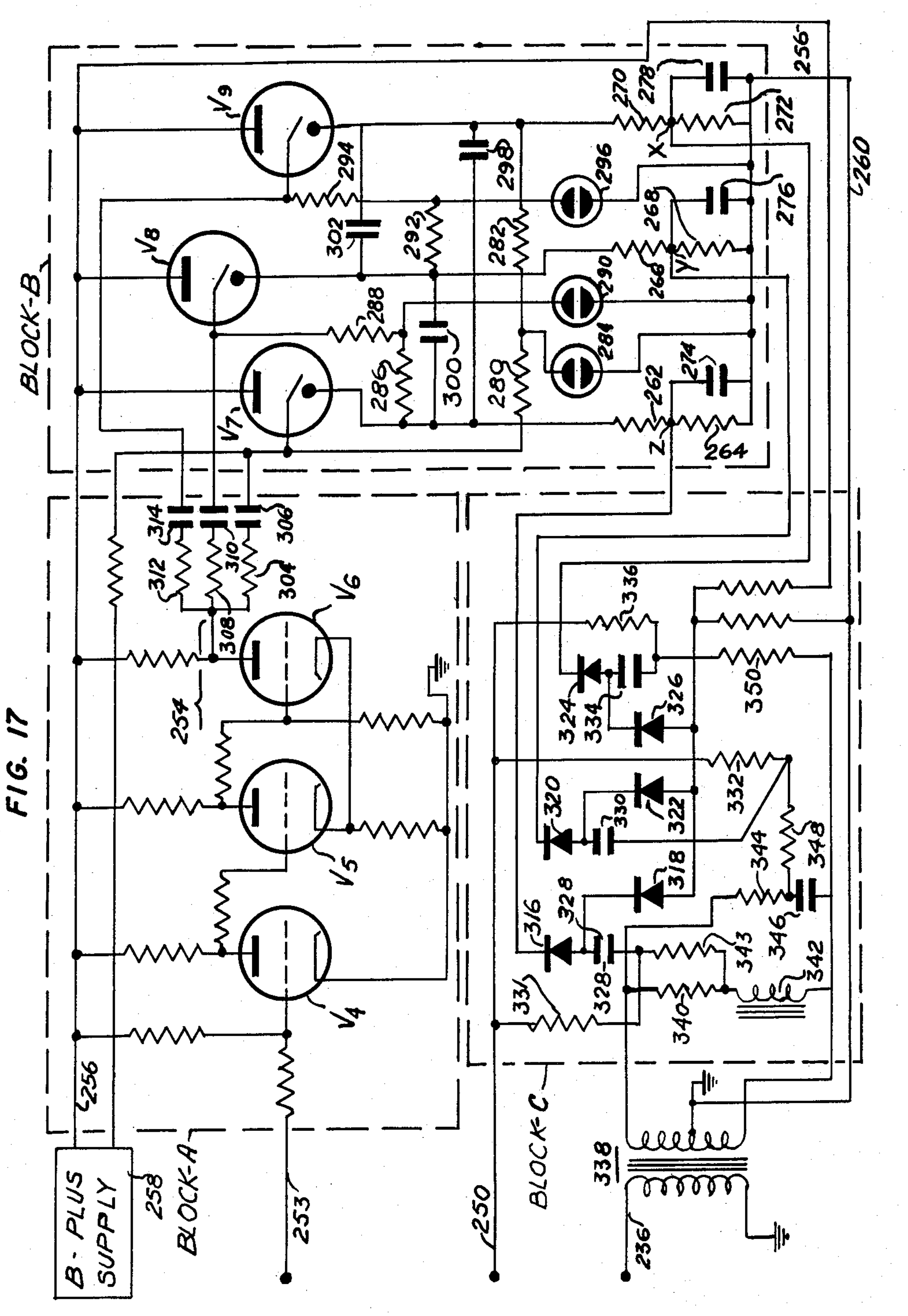

FIGURES 9A through 9D indicate the successive changes experienced by the carrier wave form in traversing portions of the receiver circuitry shown in FIGURE 8;

FIGURE 10 is a wiring diagram of the circuitry and interconnections provided by the invention for selectively effecting four successive phase displacements in a carrier wave;

FIGURE 11 is a block diagram of the receiver circuitry which is utilized in retrieving a message from a four phase modulated carrier wave;

FIGURE 12 shows diagrammatically the interrelationships between several wave forms in a three phase modulated system, and is used to explain the separation of signals in the received carrier on a time base;

FIGURE 13 is a block diagram of the apparatus employed in accomplishing electronic commutation of the incoming signals;

FIGURE 14 shows diagrammatically in partial block diagram form the circuitry and components employed for insuring that the polarity of the receiver output signal matches that of the initial transmitter input;

FIGURE 15 illustrates schematically the application of the circuit of FIGURE 14 in the 180° phase shift embodiment of the invention;

FIGURE 16 is a block diagram of circuitry provided by the invention for effecting automatic phase corrections in the embodiment of the invention which employs three input conditions or phase positions; and FIGURE 17 illustrates schematically the individual circuits and components depicted in the block diagram in FIGURE 16.

Figure 1:
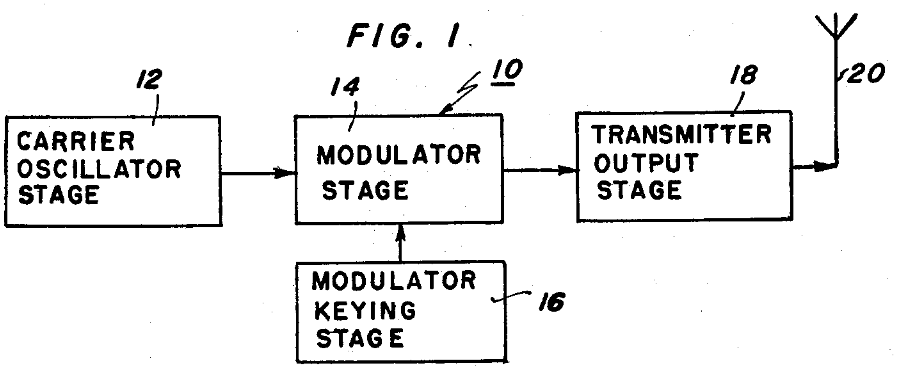
FIG. 1 is a block diagram of the transmitter provided by the present invention.

Referring more particularly to the drawings, in FIGURE 1 the numeral 10 indicates generally the components of the transmitter used in the present invention. The transmitter 10 will be seen to include a carrier oscillator stage 12. The oscillator stage 12 is characterized by the ability to produce an alternating current signal of predetermined frequency. The oscillatory signal produced by the stage 12 is applied as an input signal to modulator stage 14. The modulator stage 14 includes circuitry and components for rapidly reversing the phase of the carrier signal by 180°. Although the circuitry for accomplishing this phase reversal forms an integral part of the present invention, it should be appreciated that the reception of signals from a conventional type of phase shift keying transmitter is possible by employing the receiver system according to the present invention.

The periodic reversal of the carrier signal by the modulator stage is effected in response to signals provided by a modulator keying stage 16. The modulator keying stage 16 may include suitable electromechanical means for rapidly shunting one or more of the impedance elements within the modulator stage. It will be appreciated that space discharge devices, gas tubes, transistors or the like would be equally feasible for this purpose.

The stage 14 includes a switch 36 in order to accomplish the phase reversals in the carrier. The term "switch" as used in this connection may comprehend the several common types of electrical closures. One terminal of the switch 36 is connected to the grounded junction between resistors 26 and 30. The opposite terminal of the switch 36 is connected between the resistors 28 and 30. When the switch 36 is in the open position, the output of stage 14 takes the form of a positive electrical wave; conversely, when the switch 36 is closed, the output of the stage is reversed by 180° that takes the form of a negative electrical wave. The modulated carrier wave thus produced appears at the junction point between resistors 32 and 34.

Figure 3:
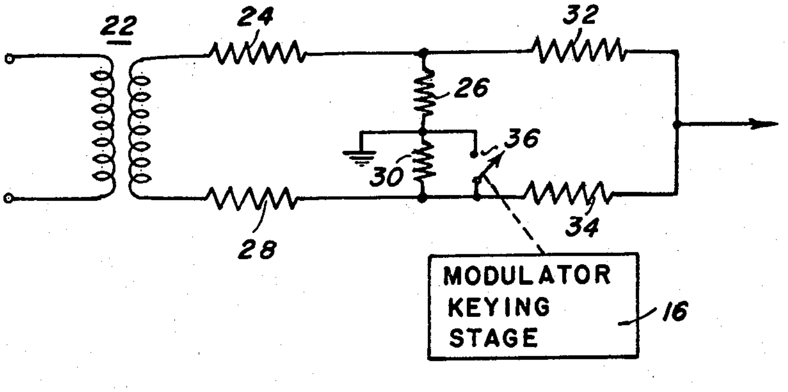
FIG. 3 is a wiring diagram of the circuitry and components of the modulator stage which is used in practicing the invention.

The switch 36 which shunts resistor 30 in FIGURE 3 is periodically opened and closed by means of the modulator keying stage 16 shown in FIGURE 1. Although the switch 36 has been referred to in terms most apt for the description of a mechanical device, it should be understood that the switching function which periodically shunts the resistor 30 may be accomplished by space discharge devices, gaseous conduction devices, or the like. For instance, the use of a pulsed Thyratron tube, or the like to shunt the resistor 30 would be included.

Figure 2:
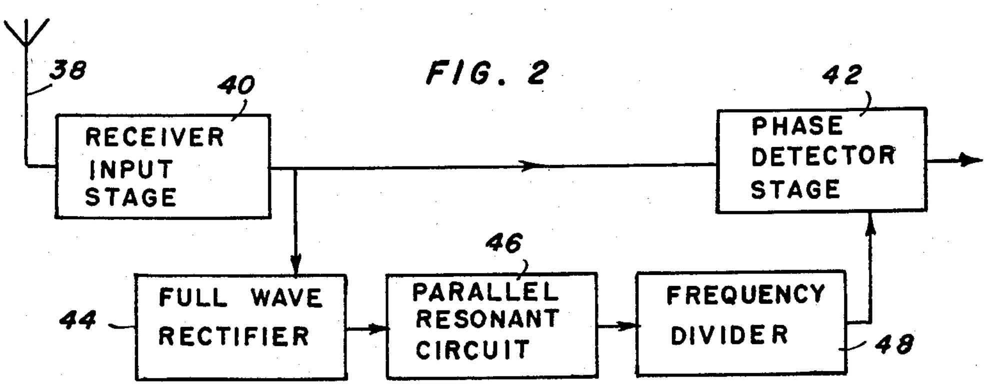
FIG. 2 is a block diagram of the receiver circuitry of the present invention.

Turning to FIGURE 2, the receiver circuitry includes a receiver antenna 38 which samples the incoming modulated carrier wave. The receiver input stage may receive energy directly from the transmitter, via a conventional coaxial cable or the like, as earlier explained in this specification. The signal received by the antenna 38 is applied to a receiver input stage 40. The stage 40 may include suitable stages of amplification for compensating for any reductions in signal strength which have occurred during the propagation of the carrier wave. Moreover, stage 40 may include suitable impedance matching circuitry and the like for insuring optimum energy transfer from the antenna, or cable, as the case may be.

The modulated signal which occurs at the output of the stage 40 is applied directly to a phase detector stage 42. In order to retrieve the information implicit in the modulated carrier, means are provided within the receiver circuit for developing a reference signal having a wave form identical with that of the carrier wave before it has been keyed, or modulated.

In order to develop such a reference signal, the modulated signal from the receiver input stage 40 is applied to a full wave rectifier 44. The succession of positive voltage impulses produced by the full wave rectifier 44 is then used to excite a parallel resonant circuit 46. The resonant circuit 46 is tuned to the second harmonic of the frequency produced by the transmitter. The parallel resonant circuit 46 is characterized by a high "Q". This high "Q" resonant circuit carries on the action of deriving a reference signal during momentary interruptions which occur in the reception of carrier as a result of keying transients or atmospheric fading. This, of course, is because of the cyclic interchange of energy which occurs between the inductance and capacitance elements in such a resonant circuit.

After the modulated carrier has been acted upon by the full wave rectifier 44 and the high "Q" parallel resonant circuit 46, there is made available within the receiver a sine wave of twice the frequency of the original oscillatory carrier signal. Even more important, however, is the fact that the output wave form developed by the resonant circuit exhibits no evidence of the keying or phase modulation which was formerly impressed thereon. By effecting a frequency division, there is provided within the receiver a phase reference signal which is accurate and completely free of the atmospheric distortion which characterizes prior art phase shift systems of the type which employ a separate reference signal.

The frequency reduction which is applied to the output of the resonant circuit is accomplished by means of a frequency divider 48. The divider 48 may comprise a conventional circuit such as a bistable multivibrator, or the like, which derives an output signal in the form of a sub-multiple of the input frequency.

The output potential of the divider 48 comprises an oscillatory signal having the same frequency as the carrier wave and constant phase. This signal is used as a reference signal within the phase detector stage 42. The stage 42 compares the phase of the incoming modulated signal with that of the constant phase reference signal provided by the frequency divider 48, and develops an output potential related to the differences therebetween.

Figure 4:
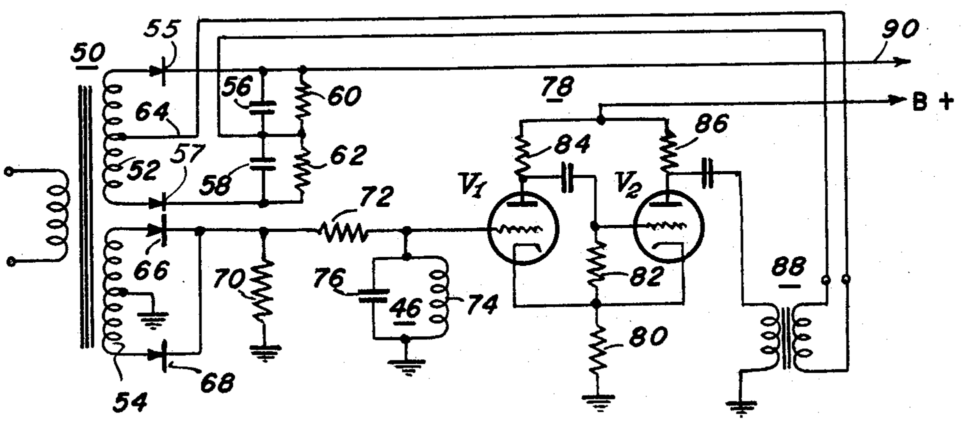
FIG. 4 is a wiring diagram of the circuitry and interconnections provided within the receiver circuit.

The circuitry and interconnections for accomplishing the functions set forth immediately above are illustrated in FIGURE 4, including a coupling transformer 50 in the lefthand portion thereof. The primary winding of the transformer 50 may receive an input signal from the receiver input stage 40. The transformer 50 is provided with a pair of secondary windings 52 and 54. The opposite ends of secondary winding 52 are connected to a pair of oppositely poled diode elements 55, 57, and the diode elements 55, 57 are interconnected by means of a pair of series connected capacitors 56 and 58. The capacitor 56 is shunted by a resistor 60, and the capacitor 58 is shunted by a resistor 62. The winding 52 is provided with a tap terminal 64 for purposes to be explained more fully below. This secondary winding taken in conjunction with the component diode elements, capacitors and resistors comprises a phase detector which is able to compare the phase of the reference signal with that of the modulated signal.

The secondary winding 54 is closed upon itself through a pair of series connected oppositely poled diode elements 66 and 68. The common connection between the diode elements 66 and 68 is grounded through a resistor 70. The potential developed across resistor 70 is coupled to a parallel resonant circuit 46 through resistor 72. The resonant circuit 46 includes a conventional inductance 74 and capacitance 76. One junction between the inductance and capacitance is grounded, and the opposite junction is connected to excite a conventional multivibrator 78 comprised of a pair of space discharge devices V1 and V2 with associated impedance elements.

The resonant circuit 46 is connected to the control grid of the space discharge device V1. The anode of V1 is interconnected to the control grid electrode of the space discharge device V2. The cathode elements of the respective discharge devices are connected in common and coupled to ground through a resistor 80. The control grid of the device V2 is connected to the commonly connected cathodes via resistor 82. Operating potential is supplied to the discharge devices V1 and V2 through plate load resistors 84 and 86, respectively. The output wave form developed by the multivibrator 78 is capacitor coupled to the primary of an output transformer 88. It will be appreciated that the function of the multivibrator 78 is to reduce by a factor of 2 the frequency of the oscillatory signal developed by the resonant circuit 46.

It will now be evident that the diodes 66 and 68 acting in conjunction with the resonant circuit 46 and the multivibrator 78 act to provide a reference signal which has a wave form substantially identical with that produced by the oscillator stage 12 within the transmitter. This unmodulated wave form is inductively coupled back to the phase detecting stage 42 by means of transformer 88 for comparison with the modulated carrier wave therein. Thus, one terminal of the secondary winding of transformer 88 is connected to the tap terminal 64 provided on winding 52. The opposite end of the secondary winding of transformer 88 is connected to the junction point between capacitors 56 and 58. The output signal developed by the phase detector 42 is made available on the conductor 90, shown in the uppermost portion of the drawing.

The interrelationships between the various wave forms which characterize the invention are illustrated in FIGURES 5A, 5B, 5C, and 5D. Thus, in FIGURE 5A, while the switch 36 occupies an open position, as indicated by the positive rectangles of FIG. 5B, the carrier wave is shown as having a particular phase relationship which may be designated as a positive or reference phase. When the switch 36 is closed, as evidenced by the negative rectangle in FIGURE 5B, the phase of the carrier shifts by 180° and becomes negative.

Figures 5A, 5B, 5C, 5D:
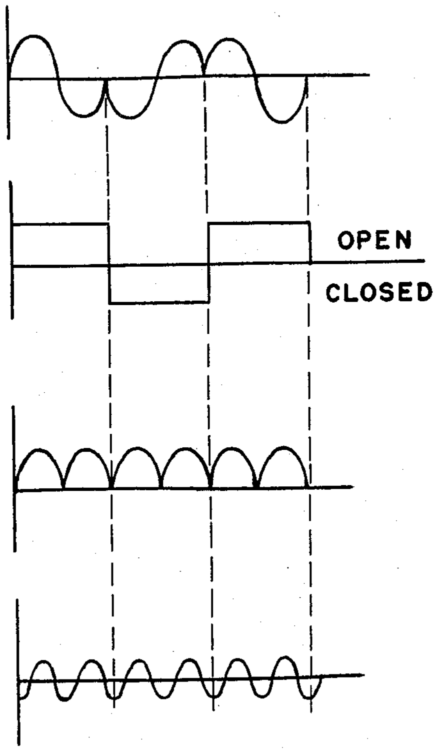
FIG. 5A illustrates the form of the modulated carrier wave.
FIG. 5B shows the time relationship between open and closed switching positions within the modulator stage and the carrier wave immediately thereabove.
FIG. 5C illustrates the form of the modulated carrier wave after full wave rectification within the receiver.
FIGURE 5D illustrates the appearance of the double frequency signal which is produced within the receiver by passing the rectified signal shown in FIGURE 5C through a resonant circuit.

In FIGURE 5C, the successive nodes or voltage pulses provided by the rectifier 44 are illustrated. Directly beneath FIGURE 5C, the double frequency sinusoidal signal produced by the resonant circuit 46 is shown. It will be recalled from the earlier portions of the detailed description that the double frequency wave form shown in FIGURE 5D exhibits no modulation, and forms a reference signal after frequency reduction within the multivibrator stage 78. As earlier explained, the reference signal thus developed is free of the atmospheric distortion and attenuation which accompanies the propagation of a separate reference signal in prior art systems.

As shown in FIGURE 6, the numeral 92 has been used to indicate generally an embodiment of the invention suitable for use in transmitting intelligence with three different input conditions or phase positions in a carrier wave. The three input conditions or phase positions which are provided by the circuitry shown in FIGURE 6 take the form of sinusoidal carrier wave signals having phase displacements of 0°, 120°, and 240° with reference to zero time.

The system for producing these phase displaced signals will be seen to include a carrier oscillator stage 94. The oscillator stage 94 is characterized by the ability to produce an alternating current output signal of predetermined amplitude and frequency. The output signal thus produced is applied to a three-phase modulator stage 96 which includes circuitry and components for rapidly shifting the phase of the carrier signal between the respective 0°, 120°, and 240° phase positions. It should be appreciated that the circuitry and components located within stage 96 for the purpose of accomplishing these rapid variations in the phase of the carrier form an integral part of the present invention and will be described in detail hereinafter.

The modulator stage 96 accomplishes the selective variation in the phase carrier signal in accordance with the operation of a modulator keying stage 98. The modulator keying stage 98 may include suitable electronic or electro-mechanical means for rapidly connecting and disconnecting the requisite values of impedance within the modulator stage in order to selectively provide the phase displaced sine wave signals necessary to the transmission of intelligence contemplated by the invention.

The phase modulated carrier wave produced at the output terminals of the stage 96 is applied to a transmitter output stage 100. The stage 100 may include conventional circuitry and components for amplifying or otherwise appropriately modifying the modulated carrier. Where it is intended to propagate the modulated signal through space as an electromagnetic wave, the output signal from stage 100 is coupled to an antenna 102. If desired, the output signals from stage 100 may be applied through a suitable coaxial cable or the like to the intended reception site, rather than by means of space propagation from an antenna. The stage 100 will be understood in this connection to include suitable equipment for providing optimum energy transfer to the antenna or cable, as the case may be, and such equipment may comprise one or more stages of conventional impedance matching circuitry.

One form of the apparatus for selectively varying the phase of the carrier wave is schematically illustrated in FIGURE 7, and includes a coupling transformer 104. The primary winding of this transformer is connected to receive the alternating carrier signal developed by the oscillator stage 94.

One end of the secondary winding of coupling transformer 104 is electrically connected through a resistor 106 to the movable arm of a three position switch 108. The switch 108 may include a conventional pivotally mounted electro-mechanical switch provided with a movable member which is capable of successively engaging any one of the three terminals. The opposite end of the secondary winding of transformer 104 is connected through a capacitor 110 to terminal 112 of the three position switch. This end of the secondary winding is also connected to one end of an inductor 114 which terminates at terminal 116 of the same switch. It will be observed that the movable arm of the switch may contact an intermediate terminal 118 located between the terminals 116 and 112. The signal from transformer 104 which is sampled by the movable element of the switch 108 is coupled to the subsequent stages of circuitry via an output conductor 120.

In order to provide a pair of sinusoidal wave forms which differ by 120° and 240° from the initial zero phase position of the carrier, it is necessary to provide definite values of impedance for the capacitor 110 and the inductor 114. The initial zero phase position is, of course, generated when the movable element of switch 108 engages the intermediate terminal 118. The value of the reactance for the inductor 114 must be such that, taken in conjunction with the other parameters in the circuit, a wave form displaced by 120° from the zero phase position is provided whenever the movable arm of the three position switch engages contact 116.

The capacitive reactance of the condenser 110 is proportioned to equal the inductive reactance of the inductor 114. When the movable arm of the three position switch 108 receives potential from terminal 112, the 120° phase shift thus will be effected in a direction opposite to that provided by the inductor 114. For open circuit conditions when the movable arm of the three position switch engages contact 118, the zero phase shift carrier wave is inductively transferred directly from transformer 104 to the output conductor 120 without the use of any phase shifting impedance elements.

In FIGURE 8, the receiver circuitry which is utilized in retrieving intelligence from the three phase modulated carrier is shown. This circuitry includes a receiver antenna 122 which samples the incoming modulated carrier wave and applies it to a receiver input stage 124. The stage 124 may also receive energy directly from the transmitter, via a conventional coaxial cable or the like, as earlier explained in this specification. The stage 124 may include suitable amplification circuitry which compensates for any reductions in signal strength occurring during the propagation of the carrier wave. Appropriate impedance matching circuitry and the like for insuring optimum energy transfer from the antenna, or cable, may also be provided within the stage 124.

The modulated signal which appears at the output of stage 124 is applied directly to a phase detector stage 126. In order to develop the message implicit in the phase modulated carrier, means are provided within the receiver circuit for developing a reference signal which duplicates the wave form of the carrier wave as it appeared prior to being modulated.

In order to develop a reference signal, the modulated signal from the receiver input stage 124 is applied to a squaring circuit 128. The output square wave derived by circuit 128 is applied to a differentiating circuit 130. The circuit 130 develops a time-spaced series of voltage spikes which occur simultaneously with the changes in sign in the output square wave developed by the circuit 128. These voltage spikes are coupled to a parallel resonant circuit 132 which is tuned to the third harmonic of the carrier wave frequency. From the resonant circuit 132, the triple frequency output sine wave is applied to a frequency divider 134. The divider 134 may comprise a conventional count-down circuit which has the capacity to produce an output signal at a frequency which is a submultiple of the input frequency.

The output potential of the frequency divider 134 comprises an oscillatory signal having the same frequency as the carrier wave and constant phase. This signal is utilized as a reference signal within the receiver after passage through a phase shifting stage 136. The phase shifting stage 136 includes circuitry and components for shifting the phase of the oscillatory input signal by 30°. By this means the output of the divider is displaced 90° out of phase with the input signal, at one of the input phase conditions. Comparison of the phase shifted reference signal produced by stage 136 with the three phase modulated carrier is accomplished within the phase detector stage 126 shown immediately above.

For the input phase with which the reference signal now exhibits a 90° phase displacement, the output of the phase detector 126 will be zero. On the other hand, the other two phase modulated positions of the carrier wave will result in positively and negatively polarized output potentials respectively. By this means, the inventive feature of transferring information with the three input conditions or phase positions is provided.

By referring to the wave forms shown in FIGURE 9A through FIGURE 9D, the successive changes in the signal accomplished by the system shown in FIGURE 8 in order to develop a reference signal from the modulated carrier will be more readily appreciated. In FIGURE 9A, the sinusoidal signal appearing at the output of the receiver input stage 124 has been designated by the reference numeral 138. Directly beneath FIGURE 9A, the appearance of the wave form produced by the squaring circuit 128 has been identified in FIGURE 9B by the reference numeral 140.

In FIGURE 9C, the wave form of a third harmonic sine wave produced by the parallel resonant circuit 132 has been identified by the reference numeral 142. Below this triple frequency sine wave, a group of output voltage spikes 144 developed by the differentiating circuit 130 have been illustrated in FIGURE 9D. It will be appreciated in this connection that the differentiation which produces the spikes 144 in FIGURE 9D occurs prior to the production of the wave form 142 within the resonant circuit.

The correspondence between the zero axis crossings of the third harmonic sine wave in FIGURE 9C and the voltage spikes in FIGURE 9D is exploited in the redevelopment of the reference signal. Thus, reference to FIGURES 9D and 9C will show that regardless of whether the input phase displacement is 0°, 120°, or 240° the voltage spikes 144 occur at the same relative time with respect to the third harmonic wave form shown in FIGURE 9C. This means that the energizing pulses which are supplied to the parallel resonant circuit 132 are characterized by a constant time spacing which is not disturbed by the keying or modulating intervals.

Continuing with the description of the invention, and more particularly with the technique for employing four input conditions or phase positions, reference will now be made to FIGURE 10 wherein the reference numeral 146 indicates generally a four phase modulator stage. The circuitry of FIGURE 10 is employed in a transmitter stage capable of selectively altering the phase of a reference carrier wave by 90° increments. Because of the basic similarity between the three phase transmitter shown diagrammatically in FIGURE 6 and the four phase transmitter which utilizes the circuitry shown in FIGURE 10, a separate block diagram of the complete four phase transmitter has not been illustrated. It is sufficient for purposes of the detailed description to indicate that the block diagram of the complete four phase transmitter is similar to that shown in FIGURE 6 except for the substitution of a four phase modulator phase between the carrier oscillator stage and the transmitter output stage.

Referring again to FIGURE 10, the four phase modulator stage shown includes a coupling transformer 148. The secondary of this transformer 148 is closed upon itself by means of a resistor 150 and capacitor 152 connected in series. It will be noted that the secondary winding of transformer 148 is provided with a grounded center tap.

The common junction between resistor 150 and capacitor 152 is conductively connected to the pivot point of a two-pole switch 154. The pivot point of switch 154 is connected to the control grid of a vacuum tube V1. The switch 154 is provided on the lefthand side with a terminal 156. On the righthand side, a terminal 158 is similarly provided. The terminals 156 and 158 are connected to the upper and lower ends, respectively, of the secondary winding of the transformer 148. The closure of the lefthand pole of the switch 154 results in shunting the resistor 150. In like manner, the closure of the righthand pole of switch 154 results in shunting the capacitor 152.

The energizing potentials present at the control grid of the tube V1 produce a sinusoidal plate current in the primary winding of the transformer 160. The secondary winding of transformer 160 is closed upon itself by means of a tapped resistor 161 and is provided with a grounded center tap. The resistor 161 is provided with the tap junction to expedite grounding any selected portion of the resistor. The tap junction on resistor 161 is connected to the movable pole of a switch 162 shown immediately to the left. The switch 162 is provided with a contact 163 conductively connected to the juncture between the upper ends of resistor 161 and the secondary winding of transformer 160.

In operation, the shunting of capacitor 152 by means of the righthand pole of switch 154 provides a 0° phase shift on the output conductor 164. It will be observed that the conductor 164 is connected to the juncture point between a pair of resistors 167 and 169. The opposite ends of these resistors are connected to the contact 163 and the lower end of the resistor 161, respectively. In the rest condition, with the poles of switches 154 and 162 in the open position, the sine wave produced on conductor 164 is characterized by a 90° phase shift. When resistor 150 is shunted by the engagement of the lefthand pole of switch 154 with contact 156, the output signal thus provided differs from the reference phase by 180°. Finally, movement of switch 162 into engagement with contact 163 gives rise to an output sine wave displaced by 270° from the reference phase.

It will be observed that the selective closure of the movable poles of switches 154 and 162 is accomplished by means of a modulator keying stage indicated diagrammatically in FIGURE 10 by the reference numeral 165. It should be understood that the invention is not limited to mechanical switching means for shunting the resistor 150, capacitor 152 or the upper portion of tapped resistor 161. For instance, the use of a pulsed thyratron or the like to provide a zero resistance path around any of these elements would be deemed to fall squarely within the purview of the appended claims.

The circuitry and components for retrieving the message from the four phase modulated carriers is indicated diagrammatically in FIGURE 11. As shown, the modulated data sensed by antenna 166 is supplied to a receiver input stage 168. After suitable amplification and modification in stage 168, the modulated signal is supplied to a phase detector stage 170. The modulated signal is also applied to a squaring circuit 172 illustrated directly beneath the input stage 168. The squared wave form thus produced is fed to a differentiating circuit 174 which produces a series of time spaced voltage spikes. These voltage spikes from circuit 174 are applied to a parallel resonant circuit 176, which is tuned to the fourth harmonic of the carrier frequency. The output of the resonant circuit 176 is applied to a frequency divider 178 comprised of circuitry for developing an output frequency one fourth of the frequency of the input signal applied thereto.

A portion of the reduced frequency potential from the frequency divider 178 is applied directly to a phase shifting stage 180. This output potential is also directly connected to the phase detector stage 170. The phase shifting stage 180 is employed for the purpose of effecting a 90° shift in the phase of the reference voltage supplied thereto. The phase shifted reference voltage thus derived is applied to an auxiliary phase detecting stage 182.

One third of the output voltage from the auxiliary phase detector stage is algebraically added to the total output potential from the phase detector stage 170 within an addition circuit 184. The circuit 184 may employ a conventional component characterized by the ability to produce an output voltage representative of the sum of the input potentials.

Because of the use of the phase shifting stage 180 with the auxiliary phase detector and addition circuit 184, the 0° and 180° phase displacements in the carrier will yield output potentials of positive and negative sign respectively. The 90° and 270° phase displacements will yield output potentials of positive and negative sign, but of one-third the magnitude of the signal produced by the 0° and 180° phase displacements. By this means, four distinct and nonambiguous values of receiver output voltage are produced to correspond with the four input phase shift values.

In FIGURE 12, there is pictorially illustrated the wave forms of a three phase system. Phase "A" is represented as a sine wave 186 having zero phase shift. Phase "B" takes the form of a sine wave 188 having a 120° phase shift and phase "C" takes the form of a sine wave 190 having a 240° phase shift. Although all of the phases are not transmitted simultaneously, they have been depicted in FIGURE 12 in this fashion in order to clarify this aspect of the invention.

Below the respective sine waves 186, 188 and 190, a triple frequency sine wave 192 is shown. It will be observed that every third peak of the triple frequency wave 192 corresponds to a peak of one of the fundamental waves. For example, the first, fourth, and seventh peak of the triple frequency wave correspond time-wise to the first, second, and third peaks of the sine wave 186. The second, fifth and eighth peaks of the triple frequency wave correspond to the peaks of the phase "B" sine wave 188. In like manner, the peaks 3, 6, and 9 of the triple frequency wave correspond to definite peaks in the phase "C" sine wave 190.

It will now be appreciated that for the occurrence of each positive peak of the triple frequency wave, there will be a positive peak in one of the carrier waves, while the other carrier waves are characterized by negative amplitudes. This correlation between positive peaks is exploited as a means of self-synchronism. Since the corresponding fundamental wave such as a phase "A," phase "B," or phase "C" can be identified by ascertaining whether coincidence is established between the peak of the fundamental wave and the first, second or third peak of the triple frequency wave 192, it is possible to establish the relative phase which has been transmitted by identifying the particular group of triple frequency waves which correspond to the received fundamental.

If the wave 186 in FIGURE 12 be regarded as a 1000 cycle per second carrier which may be periodically shifted by 120° and 240°, the positive peak of each of the received signals must invariably occur at time spacings of .001 second. Because of the 120° and 240° phase displacements, however, such positive peaks may be displaced at +.0003 second by the phase shifting technique. Thus, the 0° phase shift wave 186 may be taken as providing positive peaks which occur at .001; .002 and .003 second, and so on. On the other hand, the 120° phase shifted wave 188 has positive peaks which occur at .00033; .00133; .00233, etc. In like manner, the 240° phase shifted wave 190 is characterized by positive peaks which occur at .00066; .00166; .00266 second. By means of the electronic commutator shown in FIGURE 13, these time increments are exploited to separate the phase signals on a time basis.

In FIGURE 13, the incoming energy is sampled by an antenna 194 and applied to a receiver input stage 196. From the input stage 196, the phase modulated waves are applied to a local oscillator 198. The oscillator 198 serves to provide a frequency value three times that of the incoming frequency, and is locked in with the transmitting frequency regardless of the relative phase in which this frequency occurs. Moreover, the oscillator 198 provides a gating frequency by means of which the tubes in the ring gate 200 are energized. As a result of this gating, the incoming received signal energizes an appropriate local circuit which corresponds to a particular phase function.

The gate 200 may comprise a conventional counter which employs three normally blocked counting units operated as gates. The triple frequency signal from the oscillator 198 is applied to the counter circuitry so that the positive or negative peaks cause the signal to advance one unit in the counting direction. Each individual tube of the ring gate when thus energized will become conductive and pass the incoming signal. The incoming signal applied by input stage 196 to the ring gate 200 can only be passed by the particular tube which is gated open at this particular instant. As a result, the output of the ring gate 200 takes the form of three distinct signals, each of which corresponds to one of the carrier phases which has been transmitted.

At the start of transmission, the correct phase relationship between the transmitter and the receiver may be provided by establishing a reference phase, such as phase "A." To accomplish this, the ring gate circuitry is caused to run at an incorrect speed until proper phase relationships are established. Alternatively, the ring circuitry may be allowed to stop incorrectly, such as by utilizing only two stages until correct phase relationships are established. If desired, a signal of two alternating phases can be transmitted to change the ring rotation speed or sequence until the zero signal is received on a predetermined circuit. In general, any of the several expedients listed above may be utilized to establish proper phase relationships between the transmitter and the receiver.

Continuing with the detailed description of the invention, and referring more particularly to FIGURE 14 of the accompanying drawings, the reference numeral 202 has been used to indicate generally the circuitry and components provided by the invention for insuring that the polarity of the output signal from the receiver is the same as that present at the input to the transmitter. By employing the inventive circuitry illustrated in FIGURE 14, it is possible to insure that the polarity of the receiver output matches identically that of the transmitter input at the beginning of transmission.

In this figure, the numeral 204 is used to designate a receiver input stage of the same general type illustrated in the receiver systems shown in FIGURE 2, FIGURE 8 and FIGURE 11. The systems shown in these figures are intended for the reception of carrier waves which have been subjected to two-phase, three-phase, and four-phase modulation, respectively. The input stage 204 is connected to receive energy from an antenna 206, or the like. A portion of the output of the receiver input stage is applied to a phase detector stage by means of conductor 207. Although the circuitry shown in FIGURE 14 is applicable to all of the receiver systems described heretofore, the mode of interconnecting this circuitry in each and everyone of these receiver systems has not been illustrated in the drawings. This is because the interconnection of the additional circuitry between the receiver input stage and the juncture between the parallel resonant circuit and the frequency divider is the same in each of the above-mentioned receiver systems.

A portion of the input signal received by the receiver input stage 204 is also applied to the primary of a transformer 208. The secondary of transformer 208 is closed upon itself by means of a conventional diode element 210. A second diode element 212 is coupled to a pair of series connected resistors 214 and 216 and the resulting circuit is connected in shunt across the diode 210. A capacitor 218 is connected in parallel across resistor 216. In addition, a capacitor 220 is connected in series with a pair of resistors 222 and 223, and the resultant three-element loop is connected in parallel with diode element 212 and resistor 214.

The juncture between resistors 222 and 223 is coupled to the input of an amplifier stage 224. The output potential from the amplifier stage 224 is applied to a frequency divider 228 which also receives the output signal from a parallel resonant circuit 226. The input signal for the parallel resonant circuit 226 may be supplied from the receiver input stage 204, via any of the preceding stages of circuitry shown in the receiver systems in FIGURE 2, FIGURE 8, or FIGURE 11. The broken line designation in FIGURE 14 has been provided to indicate the applicability of the circuit to any of the several types of receivers described and illustrated earlier in the present patent specification.

In FIGURE 14, use is made of the well-known tendency of a frequency divider to lock in with an excess of synchronizing signal. As is well-known to those skilled in the art, a frequency divider which is fed an excess of synchronizing signal will lock in with the synchronizing signal on a one to one basis. Since the output frequency of all of the frequency dividers employed in the present invention is characterized by identically the same value of frequency as the input signal, large magnitudes of input signal applied to the frequency divider input terminals tend to lock such a frequency divider in the same phase as the input. When such excess signal is removed, the frequency divider tends to remain in the same phase relationship. Since this operation is performed when the phase of the transmitter is known, which is at the beginning of the transmission interval or at certain predetermined times thereafter, it is possible to insure that the polarity of the receiver output signal is always the same as that of the input to the transmitter.

The interconnection of the amplifier stage 224 in FIGURE 14 typifies the manner in which the several receiver systems previously described may be temporarily supplied an excess of synchronizing signal at the terminals of the frequency divider.

The application of the circuitry in FIGURE 14 to the 180° phase shift embodiment of the invention has been provided by way of illustration in FIGURE 15. The utilization of FIGURE 15 in the schematic of receiver circuitry shown in FIGURE 14 will become evident from the following detailed description taken in conjunction with the drawings. In FIGURE 15, the transformer 208 may be regarded as analagous to the transformer 50 shown in FIGURE 4. Thus, attention is directed to the oppositely poled diode elements 66 and 68 in FIGURE 15 which correspond to those shown in FIGURE 4. These elements, taken in conjunction with the parallel resonant circuit 46 and the multivibrator circuit 78 will be seen to duplicate the corresponding portions of the receiver circuitry shown in FIGURE 4. In order to provide the excess of synchronizing signal, additional elements have been included. These additional elements correspond to the elements described immediately above in connection with FIGURE 14. The interrelationships between the oppositely poled diode elements, and the several resistors and capacitors have been described in detail previously. The output potential developed by this portion of the circuit, as earlier mentioned, is sampled at the junction point between resistor 222 and 223 and is applied to the grid circuit of the single stage amplifier designated by the brackets 224. It should be appreciated in this connection that more than one stage of amplification may be interconnected in this fashion ahead of the frequency divider stage in the receiver circuitry. The output signal from amplifier 224 is coupled, via variable resistor 234, to the control grid of the tube V1 employed in the multivibrator circuit 78. Variable magnitudes of signal potential may be applied the tube V1 by adjusting the ohmic value of variable resistor 234.

In operation, the system illustrated in FIGURE 15 functions as follows: When no signal is applied, capacitor 218 is discharged through resistor 216 in a manner which effectively removes bias potential from the amplifier tube V3 in the amplifier stage 224. This allows the input signal to be amplified and to lock the divider in phase therewith. When the input signal is present, on the other hand, it is rectified by the diode elements 210 and 212 and the capacitor 218 is charged in a negative direction. The charging rate for the capacitor is determined by the value of the resistors 214 and 216. Charging at this rate continues until the tube V3 is cut off, which has the effect of terminating the application of excess signal to the divider, and returning the system to its normal mode of operation.

In FIGURE 16, apparatus for effecting automatic phase correction in the receiver signal is shown in block diagram form. The system shown in FIGURE 16 is intended for use in the embodiment of the invention which employs three input conditions or phase positions. By utilizing the form of the invention provided in FIGURE 16, the output of the receiver is not only locked to the transmitter input, but corrections in undesired polarity permutations effected by noise or other extraneous effects are automatically effected very rapidly. As will be appreciated more fully in connection with FIGURE 16, this automatic correction is rendered possible by employing the three-phase modulation system provided by the invention for digital or two-level transmission. In this mode of operation, only two of the three phase displaced positions are used to transmit information, despite the fact that the 120° phase shift system actually makes possible the use of three possible output levels or D.C. voltage values. In FIGURE 16, proper functioning is obtained by employing 0° and positive 120° phase displacements at the transmitter. The resulting output potentials developed by the phase detector stage in FIGURE 8 under correct phase positions are always either zero or positive. Since the transmitter is capable under this mode of operation of transmitting only the two chosen phase positions, and output polarity other than zero or positive at the receiver immediately indicates that the phase reference has shifted to an incorrect position. By means of the circuitry shown in FIGURE 16, corrective measures are immediately initiated.

The circuitry in this figure intended for use with FIGURE 8 will be seen to include a receiver input stage 124. A portion of the output potential from stage 124 is applied directly to the phase detector stage 126. The parallel resonant circuit 132 and the frequency divider 134 in FIGURE 16, it will be observed, are designated by the same descriptive reference numerals used in FIGURE 8.

In FIGURE 16, however, the output of the frequency divider is connected to a common bus 236. The bus 236 is connected to provide a signal to the input terminals of a group of three-phase shifters. A 0° phase shift unit 238, a +120° phase shift unit 240, and a −120° phase shift unit 242 are illustrated to the right of the frequency divider in this figure.

The output terminals of these three-phase shifters are in turn connected to influence a group of diode switches 244, 246 and 248, respectively. The individual output terminals of these diode switches are ganged to a common bus 250 to provide a reference signal of appropriate phase to the phase detector stage 126.

All of the diode switches are under the control of a ring counter 252. A pulse forming circuit 254 is connected, via conductor 253, to sample the output potential developed by the phase detector stage 126, and the output of this pulse forming circuit is connected to provide the input signal for the ring counter 252.

In FIGURE 17, the individual circuitry and components of the block diagram shown in FIGURE 16 are illustrated. In this figure, block A encloses the pulse forming circuit 254 shown in FIGURE 16 along with several conventional stages of amplification. The pulse forming circuit shown in block A may comprise a conventional Schmitt trigger circuit which is preceded by a pair of voltage amplifying triodes. The plural stages of triode amplification shown in this stage employ tubes V4 and V5, and the component vacuum tube of the Schmitt trigger circuit is identified by the reference character V6.

Block B in FIGURE 17 contains and encloses the ring counter circuitry 252 illustrated in FIGURE 16. This circuit includes a set of three gaseous conduction or Thyratron type tubes V7, V8 and V9.

Block C includes the 0°, +120° and −120° phase shifter units of FIGURE 16, as well as the respective diode switches 244, 246 and 248.

In block A, the triodes V4 and V5 are connected to receive anode potential from a first voltage supply bus 256. This operating potential is received through conventional plate load resistors. The supply bus 256 is energized from a B+ supply 258. The anode of tube V5 is resistor coupled to the grid of tube V6, and the cathode of tube V5 is coupled directly to the cathode of tube V6. Operating potential for the anode of tube V6 is received from the supply bus 256 via a suitable plate load resistor.

In block B, each of the gaseous conduction tubes V7, V8 and V9 in the ring counter circuitry is connected to receive anode potential from the voltage supply bus 256. The cathodes of these tubes are each connected to the ground bus 260. In the case of tube V7, this connection is made via resistors 262 and 264. Resistors 266 and 268 in the cathode line of tube V8 are conductively interposed between the ground bus and the cathode of this tube. Resistors 270 and 272 are similarly connected between ground and the cathode of tube V9.

In the cathode line of tube V7, resistor 264 is shunted by a capacitor 274. In the cathode line of tube V8, resistor 268 is shunted by a capacitor 276. In the cathode line of the tube V9, resistor 272 is shunted by a capacitor 278.

The control grid of tube V7 is connected to the cathode of tube V9 by means of a pair of series connected resistors 280 and 282. The junction point between these two resistors is isolated from ground via a gas diode 284. The diode 284 may take the form of a conventional neon lamp, or the like.

The control grid electrode of tube V8 is connected to the cathode of tube V7 by means of a pair of series connected resistors 286 and 288. The juncture between these resistors is isolated from ground by means of a gas diode or neon lamp 290.

The control grid of tube V9 is coupled to the cathode of tube V8 by means of two series connected resistors 292 and 294. The junction between these resistors is isolated from ground by means of a gas diode or neon lamp 296.

The cathode elements of tubes V7 and V9 are coupled together by means of a capacitor 298. Moreover, the cathode of tube V7 is coupled to the cathode of tube V8 by means of capacitor 300, and the cathode of tube V8 is connected to the cathode of tube V9 by means of a capacitor 302.

In order to couple the ouput signals from the pulse forming circuitry in block A into the tubes V7, V8 and V9, a group of parallel connected resistor-capacitor combinations are employed. More particularly, the control grid of tube V7 is coupled to the anode of tube V6 by means of a resistor 304 and capacitor 306 connected in series. The control grid of tube V8 is connected to the anode of tube V6 via a resistor 308 and capacitor 310 which are connected in series. Lastly, the control grid of tube V9 is coupled to the anode of tube V6 via series connected resistor 312 and capacitor 314.

In block C, the diode switches shown in block diagram form in FIGURE 16 have been illustrated more fully. The diode elements 316 and 318 form a first diode switch. Diode elements 320 and 322 form the second diode switch, and diode elements 324 and 326 form the third diode switch in this diagram.

It will be observed that one terminal of the diode 316 is connected to the junction point between resistors 262 and 264; one terminal of diode 320 is connected to the junction point between resistors 266 and 268, and one terminal of diode 324 is coupled to the connection point between resistor 270 and resistor 272.

The diode element 316 is connected to the voltage supply bus 256 through an oppositely poled diode element 318. Diode element 320 is similarly connected to the voltage supply bus 256 through an oppositely poled diode element 322. Diode element 324 is also connected through an oppositely poled diode 326 to the supply bus 256.

The output signal from the phase shifter and diode switch elements in block C is applied to a conductor 250 for application to a phase detector stage 126 as shown in the block diagram in FIGURE 16. More particularly, the junction point between diode elements 316 and 318 is coupled to conductor 250 by means of capacitor 328 and resistor 331 connected in series. The junction between diode elements 320 and 322 is connected to conductor 250 by means of capacitor 330 and resistor 332 connected in series. Lastly, the juncture between diode elements 324 and 326 is coupled through series-connected capacitor 334 and resistor 336 to the conductor 250.

In the lower left-hand corner of FIGURE 17, the reference numeral 236 designates the input signal conductor from the frequency divider 134 shown in FIGURE 16. The input signal thus conveyed is applied to a transformer 338 provided with a grounded center tap. The ends of the secondary winding of this transformer are closed upon each other through resistor 340 and choke coil 342. The junction between the later mentioned elements is connected to one plate of condenser 328 via resistor 343.

The resistor 340 and the choke coil 342 are effectively shunted by a resistor 344 and a capacitor 346. The junction between this resistor and one plate of capacitor 346 is connected, via resistor 348, to one plate of capacitor 330. The opposite side of capacitor 346 is connected through a resistor 350 to the junction point between capacitor 334 and resistor 336.

With the circuitry shown in FIGURE 17, a negative output from the phase detector stage 126 immediately signifies improper phase relationships at the output of the frequency divider 134. Because of such improper phase relationships, additional phase displacements of 120° are switched in between the divider output and the phase detector. This restores the correct phase relationships and also restores the output signals from detector 126 to the proper polarity. This is accomplished in FIGURE 16 by supplying a reference signal which is of the proper phase to give correct output polarity.

For instance, when the phase relationship between the signals is disturbed during transmission, the phase detector 126 exhibits negative output potential. This negative potential triggers the pulse forming circuit 254 and produces a positive pulse which drives the ring counter 252 one step around the ring. As a result, one of the diode switches is turned off and a different diode switch is actuated to provide the phase detector 126 with a reference signal which is 120° out of phase with the previous signal. If the phase of the reference signal is correct at this time, no negative potential appears at the phase detector output, and the ring counter 252 remains locked in this position. However, if the reference signal remains incorrect, negative voltage is again present at the output of the phase detector 126, and the ring counter 252 is driven one more step around the ring. The diode switch which is now opened shifts the reference phase to a third of the three possible 120° phase positions to give correct detector output polarity.

When the gaseous conduction device V7 in FIGURE 17 is fired, current flow commences through resistor 262 and resistor 264, with a resulting positive voltage appearing at the cathode of the tube V7. Then, through the network comprised of resistor 286, resistor 288 and the gaseous diode 290, the control grid electrode of tube V8 is raised to a potential just below that required to fire the tube. At this time, the control electrode of V9 remains at approximately ground potential.

When a positive pulse is applied from the anode of tube V6 in block A to all three control grid electrodes in block B, only the tube V8 is in condition to be triggered conductive. As a result, current flow in tube V8 is initiated and the resulting positive voltage appearing at its cathode places a large positive pulse on the cathodes of tubes V7 and V9. This lowers the plate-to-cathode voltage of these two tubes somewhat below their "keep alive" potential which extinguishes tube V7 and prevents ignition in tube V9. As a result, tube V9 is now in condition to fire immediately upon receipt of the next input pulse, and the action of the circuit can continue in ring fashion.

When tube V7 has been rendered conductive, the potential at points "X" and "Y" is zero, while point "Z" has a positive potential. Thus, the diode pairs 320 and 322 as well as 324 and 326 are biased by the voltage from the bus 256 in a forward direction. This causes these elements to present a low impedance to the A.C. signal through capacitors 330 and 334.

At this time, however, diode elements 316 and 318 are reversed biased, and present a high impedance to ground through capacitor 328. This allows the phase shifted signal from the junction of resistor 340 and choke coil 342 to pass to the signal output conductor 250 through resistors 331 and 343. The switching sequence for the circuitry is exactly analogous when either of the gaseous conduction tubes V8 or V9 are rendered conductive.

It will be apparent to those skilled in the art that many modifications of the disclosed embodiment of this invention may be made without departing from the scope thereof which is to be measured by the appended claims.

What is claimed is:

1. In a method of transferring information by means of a phase modulated carrier wave, the steps which include receiving said modulated carrier wave, rectifying said carrier wave to provide a series of positive voltage pulses, applying said positive voltage pulses to a resonant circuit to derive an alternating output signal therefrom, reducing the frequency of said alternating output signal to provide a reference signal, providing an excess of synchronizing signal to insure an absolute phase relationship between said reference signal and said phase modulated carrier wave, and comparing said reference signal with said phase modulated carrier wave.

2. In a system for receiving a phase modulated carrier wave, means including a full wave rectifier connected to sample said received carrier wave, means including a parallel resonant circuit connected to receive a signal from said rectifier and develop an output potential responsive thereto, means connected to receive and reduce the frequency of the output potential developed by said resonant circuit, means including a phase detector stage connected to receive and compare said phase modulated carrier wave with the output signal developed by said frequency reducing means, and means connected to supply said frequency reducing means an excess of synchronizing signal to lock same in an absolute phase relationship with respect to said phase modulated carrier signal.

3. In a phase shift communication system for transferring information over a distance in the form of a phase modulated signal, a transformer provided with a primary winding and two secondary windings, means including a pair of oppositely poled diode means connected across one of said secondary windings, a tuned circuit connected to receive an excitation signal from the common junction between said diode means, a multivibrator connected to sample the output potential developed by said tuned circuit and produce an output frequency having a fractional relationship therewith, a phase detector connected across the other secondary winding of said transformer, means including inductive coupling means for applying the output of said multivibrator to said phase detector for comparision with said modulated signal therein, and means interconnected to said multivibrator to periodically provide an excess of synchronizing signal thereto.

4. In a keyed phase shift communication system for transferring information over a distance in the form of a phase step modulated constant frequency carrier, in combination, a receiver input stage connected to produce as an output signal an amplified copy of said modulated carrier, phase detector means connected to sample, said output signal developed by said receiver input stage and compare said output with a phase stable reference signal, pulse generating means also connected to sample the output signal provided by said receiver input stage for generating a train of pulses having a repetition rate proportional to the frequency of said carrier, frequency multiplying means triggered by the output of said pulse generating means for producing an output potential at a frequency which is a predetermined whole multiple of the frequency of said carrier, frequency dividing means connected to receive the output of said frequency multiplying means and divide the frequency of said output by said predetermined whole multiple, and phase locking means connected with said frequency dividing means for locking the output signal from said frequency dividing means in identical phase relation with said modulated carrier before modulation thereof to provide said reference signal at said phase detector means.

5. In a system for deriving information from an intermittently keyed phase modulated carrier signal of homogeneous frequency having peak amplitudes at preselected phase positions, the combination comprising means adapted to receive the modulated carrier signal and apply a portion thereof to a phase comparison means, means adapted to derive from another portion of said received signal a single harmonic thereof having peak amplitudes each of which corresponds in time relationship to one of the peak amplitudes of the modulated carrier signal, means deriving from last said signal a wave of frequency and phase like that of the unmodulated carrier signal for comparison with the modulated carrier signal in said phase comparison means, and phase locking means connected with said last named means for locking said derived signal in identical phase relationship with an unkeyed portion of said modulated carrier signal.

6. In a phase shift communication system for transferring information over a distance in the form of a modulated carrier, in combination, a receiver input stage connected to produce as an output signal an amplified copy of said modulated carrier, phase detector means connected to sample said output signal developed by said receiver input stage and compare said output with a reference signal, pulse generating means also connected to sample the output signal provided by said receiver input stage for generating a train of pulses having a repetition rate proportional to the frequency of said carrier, frequency multiplying means triggered by the output potential at a frequency which is a predetermined whole multiple of the frequency of said carrier, frequency dividing means connected to receive the output of said frequency multiplying means and divide the frequency of said output by said predetermined whole multiple, phase locking means connected with said frequency dividing means for locking the output signal from said frequency dividing means in a first phase relationship with said modulated carrier, and phase shifting means connected to receive phase locked output of said frequency dividing means and shift the phase thereof from said first phase relationship to a second phase relationship with said modulated carrier to provide said reference signal at said phase detector means.

7. In a method of transferring information by means of keyed phase modulations of a constant frequency carrier wave, the steps which include receiving said modulated carrier wave, generating a series of voltage pulses having a repetition rate porportional to the frequency of said carrier wave, deriving an alternating output signal from said pulses having a frequency which is a whole multiple of said carrier frequency, reducing the frequency of said alternating output signal to the frequency of said carrier to provide a reference signal corresponding to the carrier wave before modulation, locking said reference signal in predetermined phase relationship with said carrier wave before modulation, and comparing said reference signal with said phase modulated carrier wave.

8. In a phase shift communication system for transferring information over a distance in the form of a phase modulated carrier, in combination, a receiver input stage connected to produce as an output signal an amplified copy of said modulated carrier, phase detector means connected to sample said output signal developed by said receiver input stage and compare said output with a reference signal having an absolute phase relationship with said output, pulse generating means also connected to sample the output signal provided by said receiver input stage for generating a train of pulses having a repetition rate proportional to the frequency of said carrier, frequency multiplying means triggered by the output of said pulse generating means for producing an output potential at a frequency which is a predetermined whole multiple of the frequency of said carrier, frequency dividing means connected to receive the output of said frequency multiplying means and divide the frequency of said output by said predetermined whole multiple, and means connected between said input stage and said frequency dividing means for providing said frequency dividing means with an excess of synchronizing signal whereby the output of said frequency dividing means will be initially locked in coincident phase relationship with said modulated carrier to provide said reference signal at said phase detector means.

9. In a receiver for a phase shift keyed signal of a given frequency with portions of different predetermined phases, the combination comprising: means to produce from said phase shift keyed signal a reference signal having a frequency equal to the frequency of said phase shift keyed signal and a phase with respect to said phase shift keyed signal determined by a phase locking signal applied to said means; means connected to said first-mentioned means to provide said phase locking signal produced from one phase of said phase shift keyed signal to cause said first-mentioned means to produce said reference signal which is locked in phase with said one phase of said phase shift keyed signal; and means responsive to said reference signal and said phase shift keyed signal to produce an output dependent on the phase relationship between said reference signal and said phase shift keyed signal.

10. In a communication system employing a single frequency wave phase modulated in discrete proper fractions of a cycle whereof the denominator is in integer greater than 2 and whereof a predetermined said fraction is excluded as a transmitted phase of modulation, receiver means reproducing a replica of said wave as transmitted, means multiplying the frequency of said reproduced wave by said integer to produce a multiple frequency wave synchronous with said replica, means deriving an unmodulated wave of said single frequency from said multiple frequency wave, phase comparator means coupled for response to said replica and said unmodulated wave having an output of predetermined sign when the phase of said unmodulated wave corresponds to said excluded phase, ring gate means having sequentially operative stages equal in number to said integer and connected for actuation to a succeeding said stage for each occurrence of a said output, and means shifting the phase of said unmodulated wave by one said fraction of a cycle in response to each said actuation of said ring gate means.

11. In a receiver for a transmitted single frequency communication wave which is phase shift modulated only in $n$ discrete multiples of a phase angle of $$\frac{2\pi}{n+1}$$

where $n$ is an integer greater than 1, means receiving said wave in its instantly modulated phases, frequency multiplying and dividing means developing an unmodulated wave having voltage peaks selectively synchronous with each said phase of transmitted wave, phase comparison means responsively connected to compare the phase of said received and developed waves to produce a distinctive output at phase coincidence between said received and said unmodulated wave when in a predeterminedly forbidden one of said $n+1$ phases, ring gate means of $n+1$ sequentially active stages each with an output individual thereto and operative from one said stage to a succeeding stage in response to a said distinctive output, and means shifting the phase of said developed wave in sequential succession under control of the instantly active one of said ring gate outputs, said shifting means being ineffective to cause said distinctive output except when said forbidden one of said $n+1$ discrete phase modulations is compared.

12. In a keyed communication system for transmitting information as selectably shifted allocations of phase of a single frequency wave, said allocations of phase being in multiples of $$\frac{2\pi}{n+1}$$

where $n$ has integer values than 1 of which $n$ said allocated shifts are selectably keyed by information signals and a particular one of said allocated shifts is forbidden in said system, receiver means developing a signal having $n+1$ voltage peaks synchronous with said $n+1$ selectable allocations of phase, receiver means reproducing said wave as instantly keyed in one of said $n$ phase allocations, means producing from said developed signal a wave of voltage peaks of said frequency unmodulated in phase, means comparing phases of said produced and reproduced waves, means indicating which of said $n$ allocations is instantly received and compared, and means shifting the phase of said developed wave by $$\frac{2\pi}{n+1}$$

whenever said comparing means indicates a said reproduced wave in phase with said particular shift of phase forbidden in said system.

13. In a communication system employing a single carrier frequency selectively phase keyed in predetermined multiples of a cycle fraction equal to the reciprocal of an odd integer larger than said predetermined multiples thereby to produce used phase allocations and a specified unused phase allocation, a phase modulation receiver developing an output individual to each of said phase allocations, means responsive to a said output corresponding to said specified unused allocations for causing cancellation thereof as a receiver output.

14. The method of comparison of the phase of a received communication wave modulated in a specified $n$ of $n+1$ equal allocated phase steps with a local wave of the same frequency, the remaining said step being excluded, comprising locally receiving and filtering said wave, locally generating a wave of said frequency unmodulated but variable in phase in said $n+1$ steps, comparing the phases of said received and generated waves, developing a signal in response to coincidence of said generated wave phase with said excluded phase step, and employing said developed signal to advance the phase of said generated wave by one said phase step when said signal is developed.

15. A method of demodulation of a transmitted communication wave of fixed frequency and having $n$ selected fixed phase steps of $n+1$ equal steps per cycle, which includes reproducing at a receiver a replica of said wave as a corresponding phase function of said fixed frequency wave, generating a local wave of said frequency from said reproduced wave having selectable phases corresponding to each of said $n+1$ steps, sensing correspondence between said reproduced wave phase and said generated wave phase instantly selected to provide a demodulated output, sensing correspondence between said reproduced wave and said step of the generated wave which corresponds to the one of said $n+1$ steps not selected, and employing last said correspondence to advance said generated wave by one said step upon the sensing thereof.

References Cited in the file of this patent

UNITED STATES PATENTS

| | | |
|---|---|---|
| 1,922,282 | Bellescize | Aug. 15, 1933 |
| 2,064,106 | Crosby | Dec. 15, 1936 |
| 2,259,000 | Nyquist | Oct. 14, 1941 |
| 2,340,432 | Schock | Feb. 1, 1944 |
| 2,513,731 | Loughlin | July 4, 1950 |
| 2,565,504 | Labin et al. | Aug. 28, 1951 |
| 2,676,245 | Doelz | Apr. 20, 1954 |
| 2,833,917 | Babcock | May 6, 1958 |
| 2,991,354 | Crafts | July 4, 1961 |

FOREIGN PATENTS

| | | |
|---|---|---|
| 370,449 | Great Britain | Apr. 8, 1932 |